United States Patent
Altheimer et al.

(10) Patent No.: US 6,213,603 B1
(45) Date of Patent: Apr. 10, 2001

(54) PROGRESSIVE OPHTHALMIC LENS

(75) Inventors: Helmut Altheimer, Baisweil; Gregor Esser, Haar; Herbert Pfeiffer, Munich; Rudolf Barth, Vierkirchen; Monika Fuess; Walter Haimerl, both of Munich, all of (DE)

(73) Assignee: Optische Werke G. Rodenstock, Munich (DE)

( * ) Notice: Subject to any disclaimer, the term of this patent is extended or adjusted under 35 U.S.C. 154(b) by 0 days.

(21) Appl. No.: 09/370,246

(22) Filed: Aug. 9, 1999

Related U.S. Application Data (63) Continuation of application No. 09/029,715, filed as application No. PCT/DE97/01425 on Jul. 7, 1997, now abandoned.

(30) Foreign Application Priority Data

Jul. 5, 1996 (DE) ................................. 196 27 006

(51) Int. Cl.[7] .................. G02C 7/06; G02C 7/02
(52) U.S. Cl. ........................... 351/169; 351/176
(58) Field of Search ................... 351/169, 168, 351/170–172, 176–177

(56) References Cited

U.S. PATENT DOCUMENTS

| | | | |
|---|---|---|---|
| 5,210,553 | * | 5/1993 | Barth et al. ............ 351/169 |
| 5,327,181 | * | 7/1994 | Waido ................... 351/169 |
| 5,886,766 | * | 3/1999 | Kaga et al. ............ 351/169 |

* cited by examiner

*Primary Examiner*—Georgia Epps
*Assistant Examiner*—Jordan M. Schwartz
(74) *Attorney, Agent, or Firm*—Antonelli, Terry, Stout & Kraus, LLP (57) ABSTRACT

A progressive ophthalmic lens including at least one distant vision zone in which the power is suitable for distant viewing, at least one near vision zone in which the power is suitable for near viewing, and at least one progression zone in which the power varies continuously from the power of the distant vision zone to the power of the near vision zone along a principal line, at least one surface of the ophthalmic lens contributing to the power variation. A surface astigmatism of the at least one of surface of the ophthalmic lens contributing to the power variation along at least one horizontal intersection, represented by an intersection of the ophthalmic lens and a horizontal plane where y=const, has a local maximum value located at a distance of not more than 4 mm from the principal line, and at least one local minimum value which does not lie on the principal line and is located at a greater distance from the principal line than the local maximum value.

18 Claims, 9 Drawing Sheets

PROGRESSIVE OPHTHALMIC LENS

CROSS REFERENCE TO RELATED APPLICATION

This is a continuation of U.S. application Ser. No. 09/029,715, filed Mar. 3, 1998, now abandoned, which is a 371 of PCT/DE97/01425, filed Jul. 7, 1997, the subject matter of which is incorporated by reference herein.

DESCRIPTION

1. Technical Field

The present invention relates to a progressive ophthalmic lens.

2. State of the Art

Progressive ophthalmic lenses are, by way of illustration, known from DE-C-30 16 935 or WO 95/27229. Moreover, reference is explicitly made to the latter publication regarding all terms not defined in detail herein.

The known generic progressive ophthalmic lenses have one or two surfaces with continuously varying power (progressive surface). On a progressive surface, the power increases from the respective suited-for-distant-vision value BK [dpt] in the distance reference point with the coordinates x=0 mm, y=8 mm (selected within the scope of the present application) in the lower region of the distant vision part along a sinuous line to a suited-for-near-vision value BF [dpt] in the near vision reference point, which is located in the upper region of the near vision part. The value BF is higher by the amount Add [dpt] of the addition than the power BK in the lower region of the distant vision part.

The course of the sinuous line, which hereinafter is also referred to as the principal line, is selected in such a manner that it coincides at least approximately with the principal line of vision when the glance is lowered, i.e. with the point of penetration of the visual ray through the surface with continuously varying power when the glance is lowered. With ophthalmic lenses, in which only one surface, usually the front surface, of the ophthalmic lens contributes to the power variation, the eye-side surface is designed to be spherical or aspherical in the case of an astigmatic prescription, toric or atoric.

In the known progressive ophthalmic lenses of the type mentioned in the preceding, the distant vision zone is relatively large so that it grants the wearer a good general view over a wide range without any turning of the head.

However, the near vision zone is relatively narrow so that the head already has to be turned when reading a newspaper in order that several columns may be viewed. In the state of the art, particularly ophthalmic lenses which have negative power in the distant vision zone and are made of a high-refracting material, have an especially narrow near vision zone.

DESCRIPTION OF THE INVENTION

The object of the present invention is to provide a progressive ophthalmic lens, which can have negative power, in particular, in the distant vision reference point and is made of a material with a refractive index of >1.58 and which has a relatively wide near vision zone.

According to element of the present invention the surface astigmatism of at least one of the surfaces contributing to the power variation along at least one intersection of the ophthalmic lens with a horizontal plane (y=const., hereinafter referred as horizontal intersection) has a local maximum value, which is at a distance of not more than 4 mm, preferably not more than 2 mm, from the principal line, and at least one local minimum value, which does not lie on the principal line, and which is at a greater distance from the principal line than the local maximum value.

Thus, the concept of the progressive ophthalmic lens of the present invention breaks with the conventional manner of proceeding: in the known progressive lenses the surface astigmatism on the principal meridian or the principal line has a minimum value, usually even an absolute minimum value. In ophthalmic lenses in which the principal line is designed as a so-called umbilical line, i.e. as a sequence of points at which the surface astigmatism is 0 dpt, this is already yielded by Minkwitz's principle, according to which the surface astigmatism increases perpendicularly to an umbilical line with a gradient having twice the value of that of the surface power on the umbilical line, Even for ophthalmic lenses, in which the surface astigmatism on the principal line is not 0 dpt, but a certain amount of the surface astigmatism is selectively "taken into account" in order to reduce the peripheral aberrations, the amount of the surface astigmatism on the horizontal intersections on the principal line has a minimum value, usually an absolute minimum value. With regard to this, reference is made to DE-C-30 16 935 mentioned in the preceding, in which the progressive lenses are described with a surface astigmatism on the principal line of vision, which, in order to correct the peripheral aberrations, deviates from the value of 0 dpt in the progression zone. DE-C-30 16 935 imparts, in particular, the teaching that astigmatism in the progression zone starting from a value of 0 dpt at the lower edge of the distant vision zone should attain a maximum value in the progression zone and subsequently should drop again to a value of 0 dpt in the upper region of the near vision zone.

In accordance with the present invention it has been recognized that an improved ophthalmic lens with an, in particular, wider near vision section is yielded by forfeiting this traditional concept.

A distant vision zone is provided, which is disposed in the upper part of the ophthalmic lens and in which the near vision zone(s) is (are) disposed in the lower part of the ophthalmic lens, it is especially preferred if the horizontal intersection(s) on which a local maximum value of the surface astigmatism occurs, lies in the lower part of the progression zone and/or in the upper part of the near vision region. In this way a near vision zone is yielded, which is at least 25% wider than the near vision zone in known generic progressive ophthalmic lenses. It is assumed in accordance with the usual definition, that the delimitation line of the near vision zone is the line on which the amount of the overall astigmatism, thus not the surface astigmatism, has a value of 0.5 dpt.

Within the scope of the coordinate systems selected in the present application, numerical y-values, in which a local maximum value of the surface astigmatism occurs on the principal line or in the immediate vicinity thereof for all the horizontal intersections.

The surface astigmatism in the upper part of the progression zone and in the distant vision zone has a minimum value on the principal line. This teaching contradicts that of DE-C-30 16 935.

It is explicitly pointed out that the concept of the invention for the course of the surface astigmatism along the horizontal intersections does not mean that the overall astigmatism also has a topologically similar course.

Rather, the overall astigmatism on the principal line on each horizontal intersection has at least a minimum between y=15 mm, and y=−20 mm, that can assume absolutely very small values and, in particular, the value of 0 [dpt].

Consequently the concept of the present invention means that, at least in the lower region of the progression zone and in the upper region of the near vision zone, the principal line is not an umbilical line. Therefore, it is particularly advantageous if the surface astigmatism increases approximately linearly along the principal line in the lower region of the distant vision part. Yielded is a "soft" transition from the "essentially surface astigmatism-free" distant vision zone, in which there is no or only minimal surface astigmatism on the principal line and in a large surrounding region, to the parts of the surface, in which the principal line has surface astigmatism.

The transition can occur by the gradient of the function of the surface astigmatism on the principal line being a function of the base curve and of the addition.

Furthermore, in accordance with the present invention, it has been realized that a better corrected ophthalmic lens is yielded if the gradient of the horizontal intersections on the site of the principal line as a function of y is not strictly monotonous. The correction can be further improved if the gradient of the horizontal intersections on the site of the principal line as the function of y is not only not strictly monotonous, but according is not monotonous at all.

It is, in particular, only necessary to relinquish the monotony of the gradient of the horizontal intersections on the site of the principal line as a function of y only below the so-called distant vision reference point.

The concept on the invention permits, in particular, to select the surface power along the principal line in the near vision part in such a manner that the use value of the power in the near vision part is constant up to approximately y=−20 mm. It is explicitly pointed out that this does not mean that the surface power is also constant. The constant use value of the power permits the wearer to use the whole near vision part without accommodation variations, permitting, by way of illustration, working at a desk without tiring.

Contributing to this is also that the principle curvature directions along the principal line are constant in the lower region of the distant vision part. Due to this feature, the axis of a possibly present overall astigmatism does not rotate.

The concept of the invention may, of course, also be realized in ophthalmic lenses in which both surfaces contribute to the variation in power. However, it is especially advantageous in ophthalmic lenses in which only one surface, in particular, the front surface contributes, because excellent correction is yielded even if only one surface contributes to the power variation.

BRIEF DESCRIPTION OF THE DRAWING

The present invention is made more apparent in the following using preferred embodiments with reference to the drawing showing in.

DESCRIPTION OF PREFERRED EMBODIMENTS

FIGS. 1a to 1e show the properties of a first embodiment for an invented ophthalmic lens. An x, y coordinate system is consistently employed as the coordinate system, in which in the use position the y-axis is the vertical axis. The origin of the coordinate system is selected in such a manner that the so-called distant vision reference point has the coordinates y=0 mm and x=8 mm.

Figure 1A:
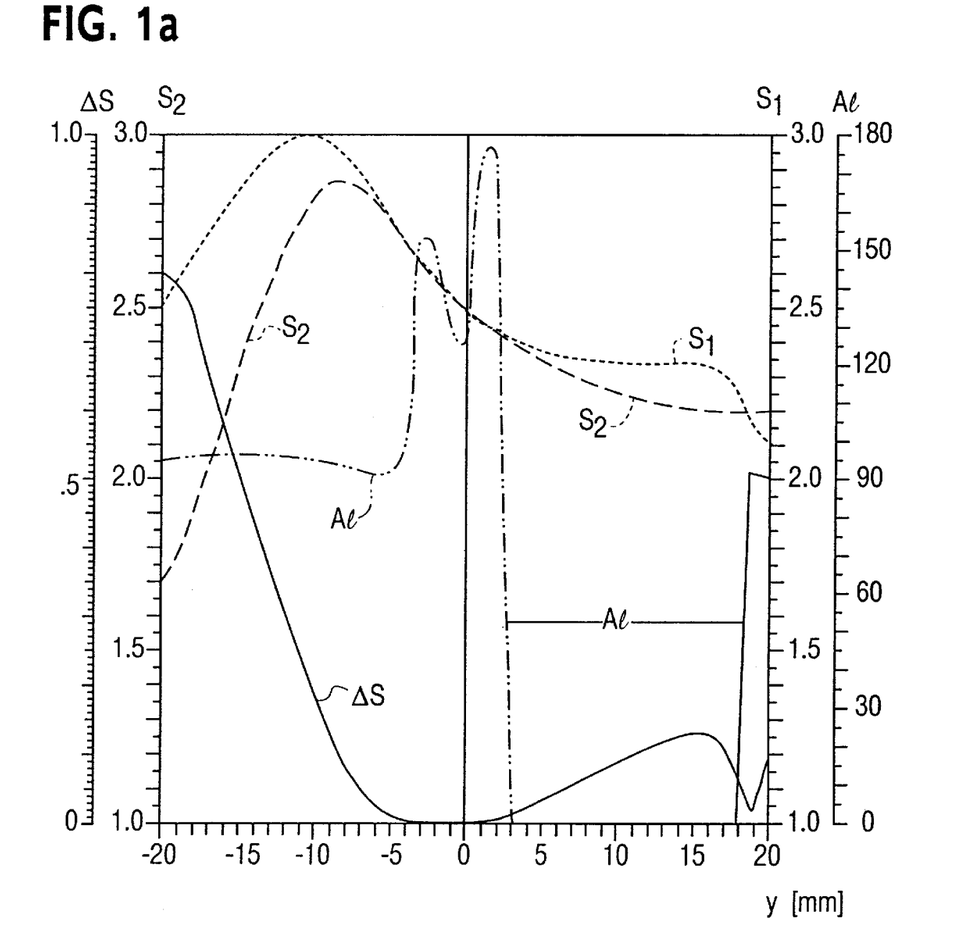
FIG. 1a—the surface properties along the principal line, for an ophthalmic lens with a base curve of 2.3 dpt, an addition of 1.0 dpt and a refractive index of 1.807, FIG. 1b—the gradient of the horizontal intersections along the principal line for this ophthalmic lens, FIG. 1c—the same surface properties as in FIG. 1a, however along the horizontal intersection at y=−1 mm, FIG. 1d—the same surface properties as in FIG. 1c, however along the horizontal intersection at y=−14 mm, FIG. 1e—the surface astigmatism for this ophthalmic lens, FIG. 2—a representation according to FIG. 1a of an ophthalmic lens with a base curve of 2.3 dpt, an addition of 2.0 dpt and a refractive index of 1.807, FIG. 3—a representation according to FIG. 1a of an ophthalmic lens with a base curve of 2.3 dpt, an addition of 3.0 dpt and a refractive index of 1.807, FIG. 4—a representation according to FIG. 1a of an ophthalmic lens with a base curve of 3.2 dpt, an addition of 1.0 dpt and a refractive index of 1.807, and FIG. 5—a representation according to FIG. 1a of an ophthalmic lens with a base curve of 3.2 dpt, an addition of 2.0 dpt and a refractive index of 1.807.
Figure 1B:
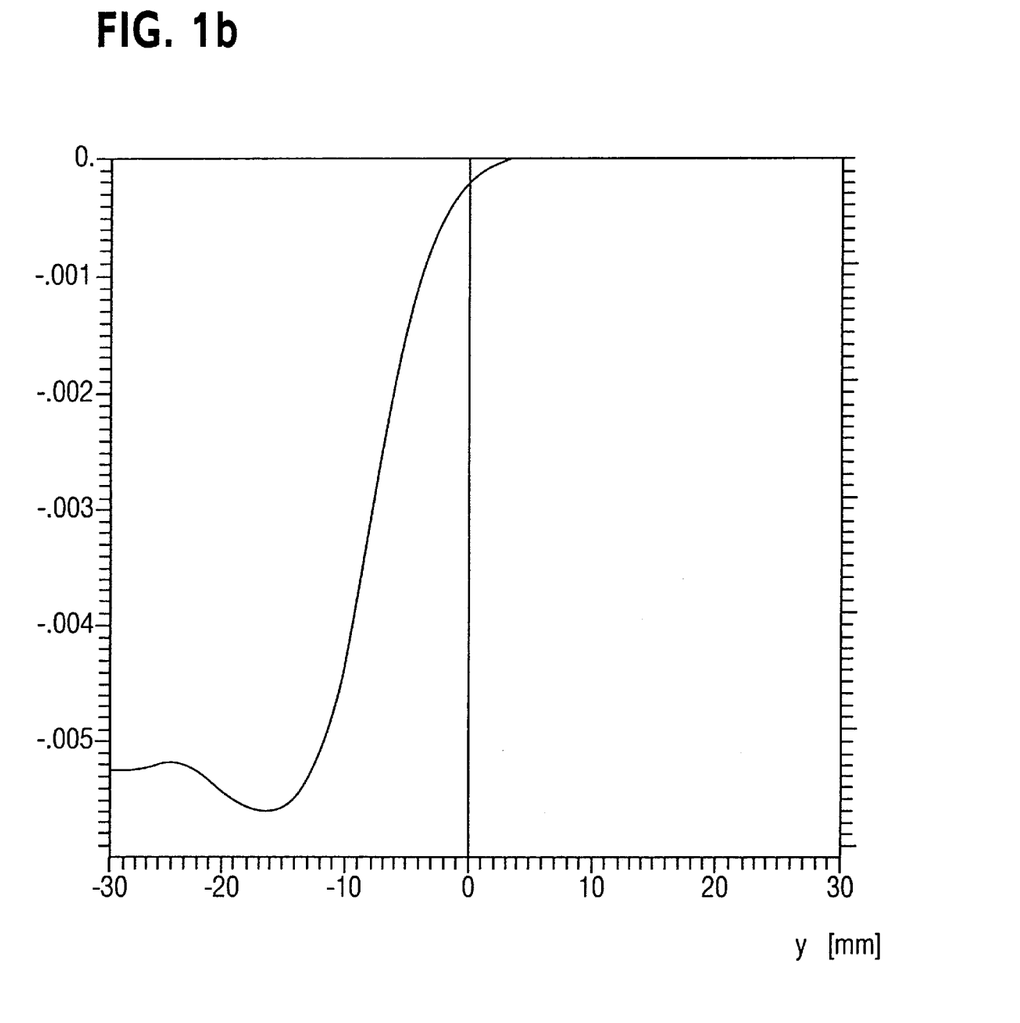
Figure 1C:
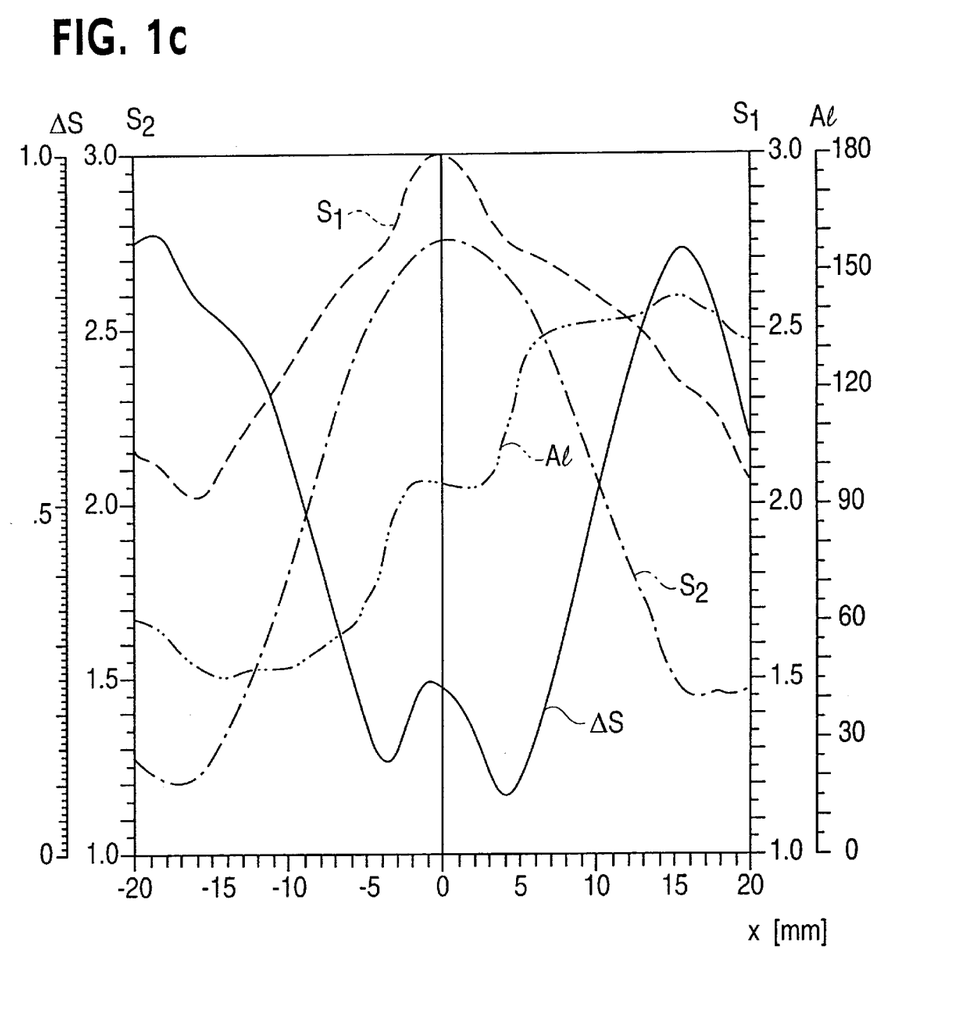
Figure 1D:
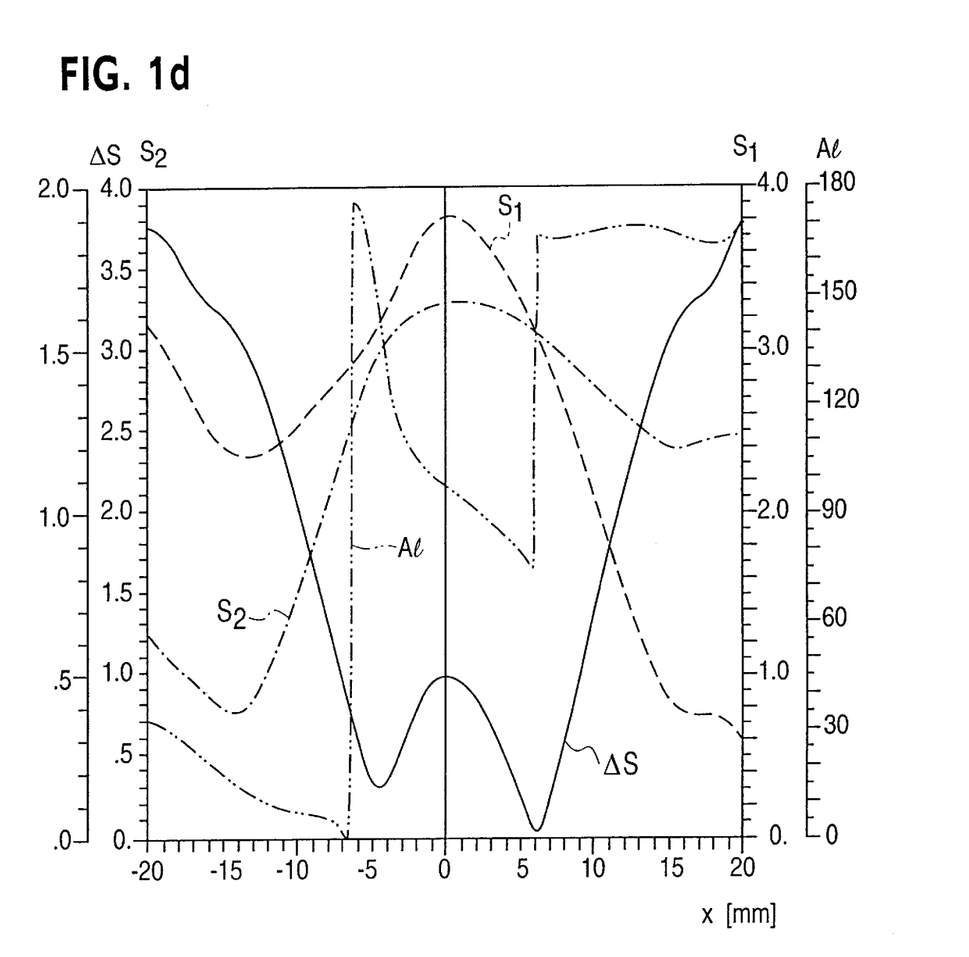

In FIGS. 1a, 1c and 1d the following values are given:

Surface astigmatism $\Delta S = S_1 - S_2$ dpt

Greater ($S_1$) and smaller ($S_2$) value of the surface power in both principle sections, in dpt Axis direction A1 of the surface astigmatism according to TABO in degrees.

Figure 1E:
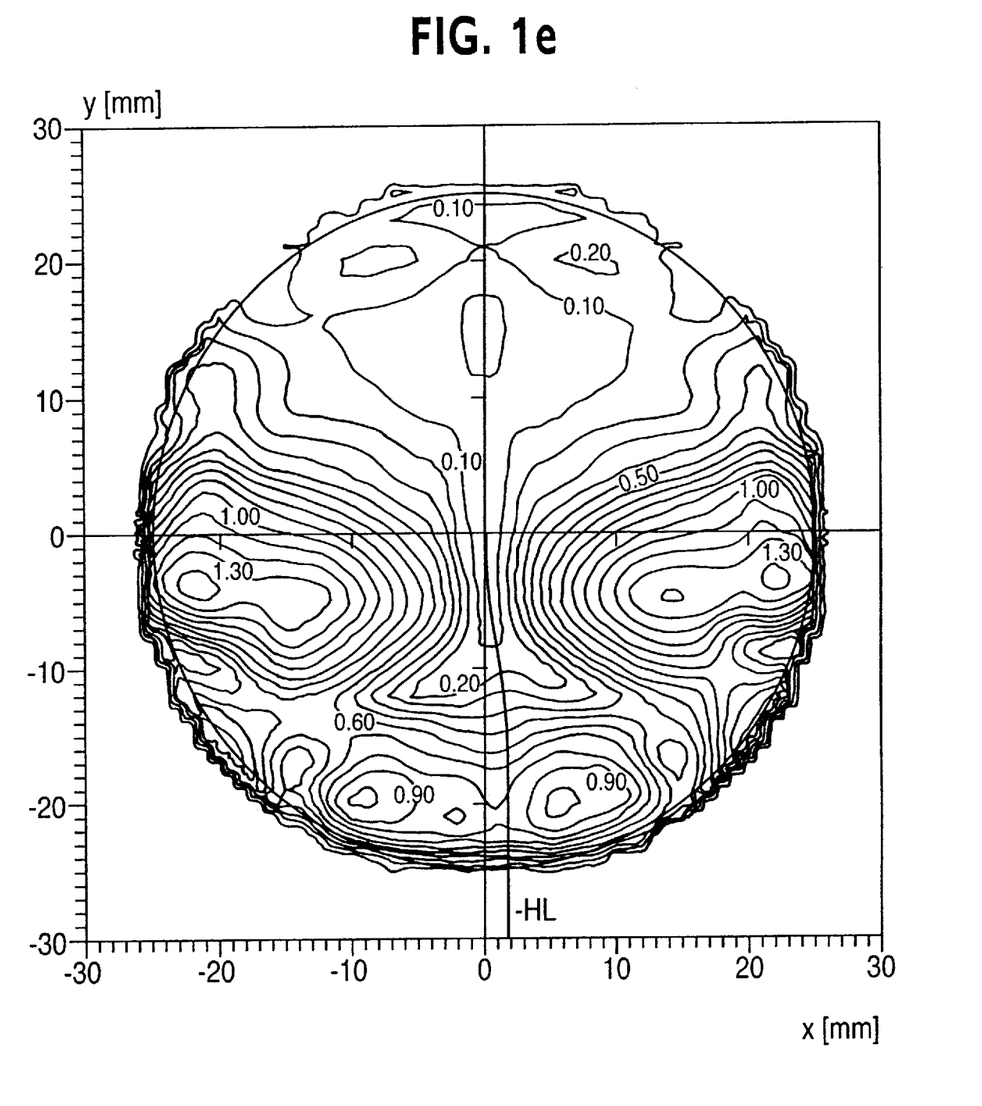
Figure 2:
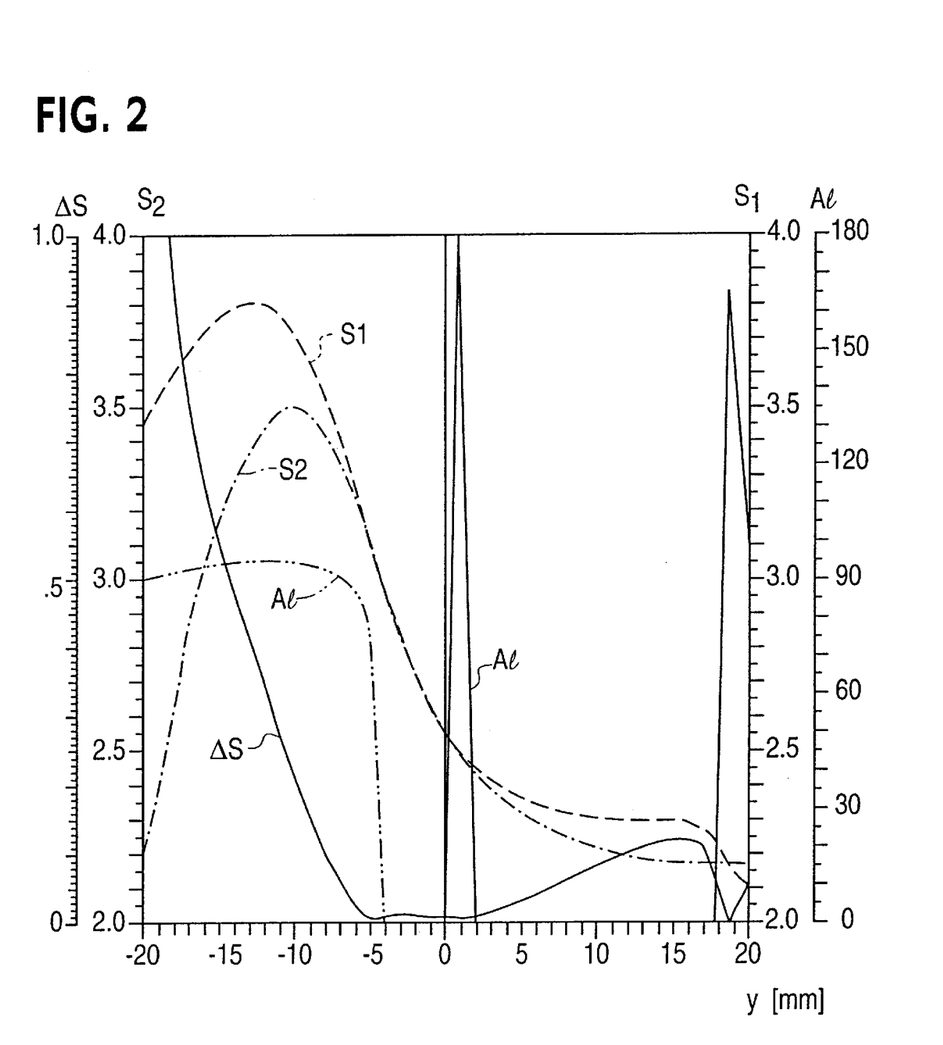
Figure 3:
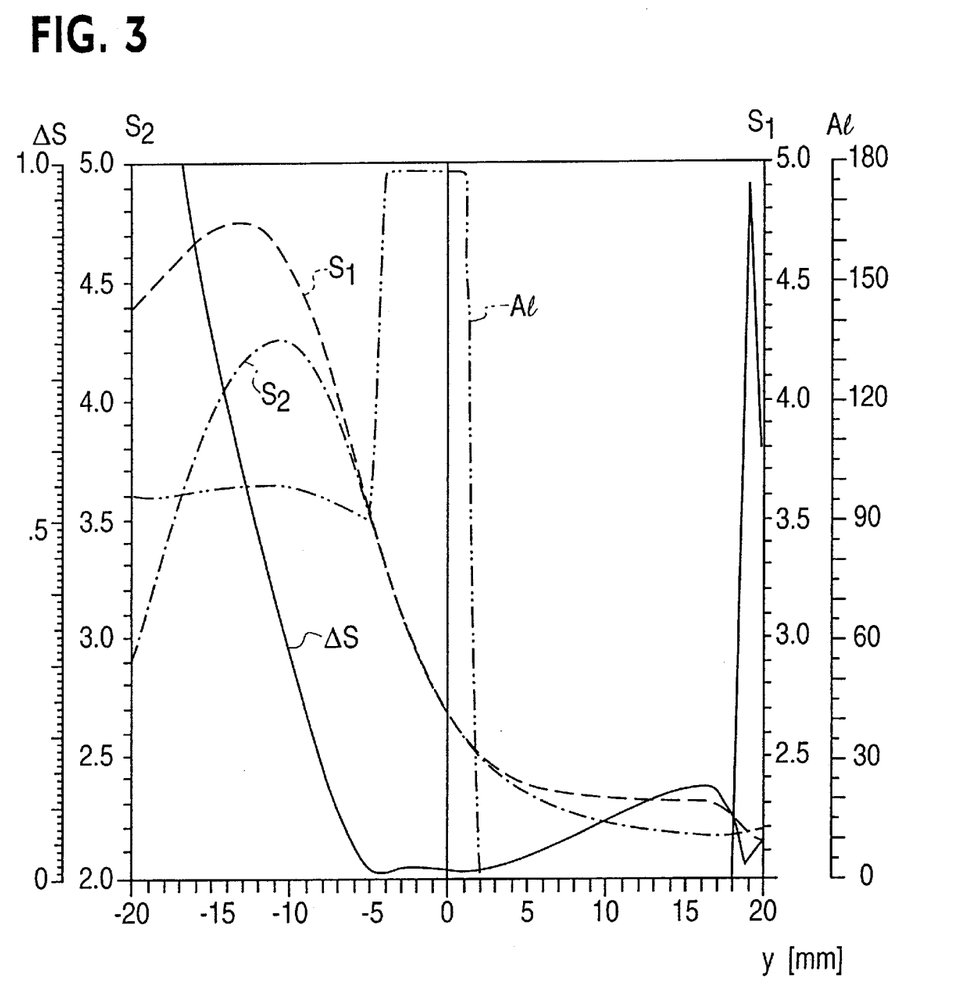
Figure 4:
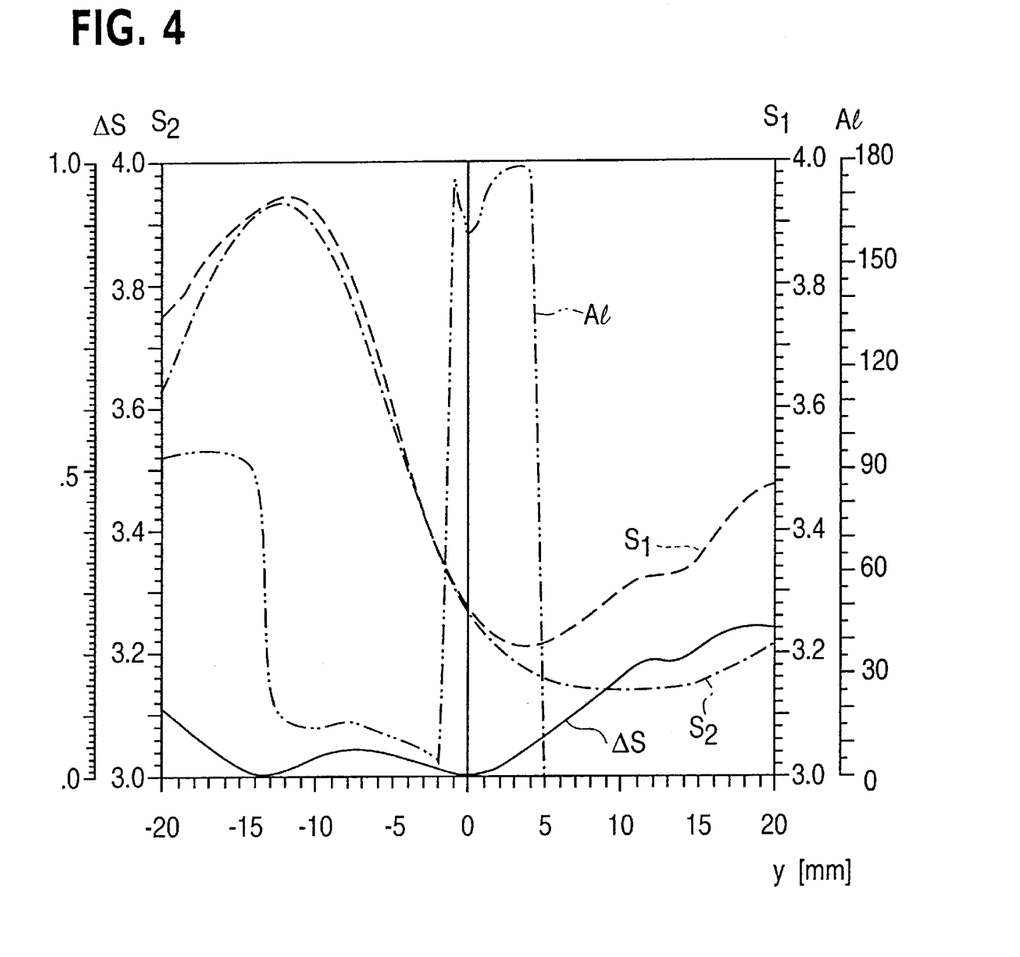
Figure 5:
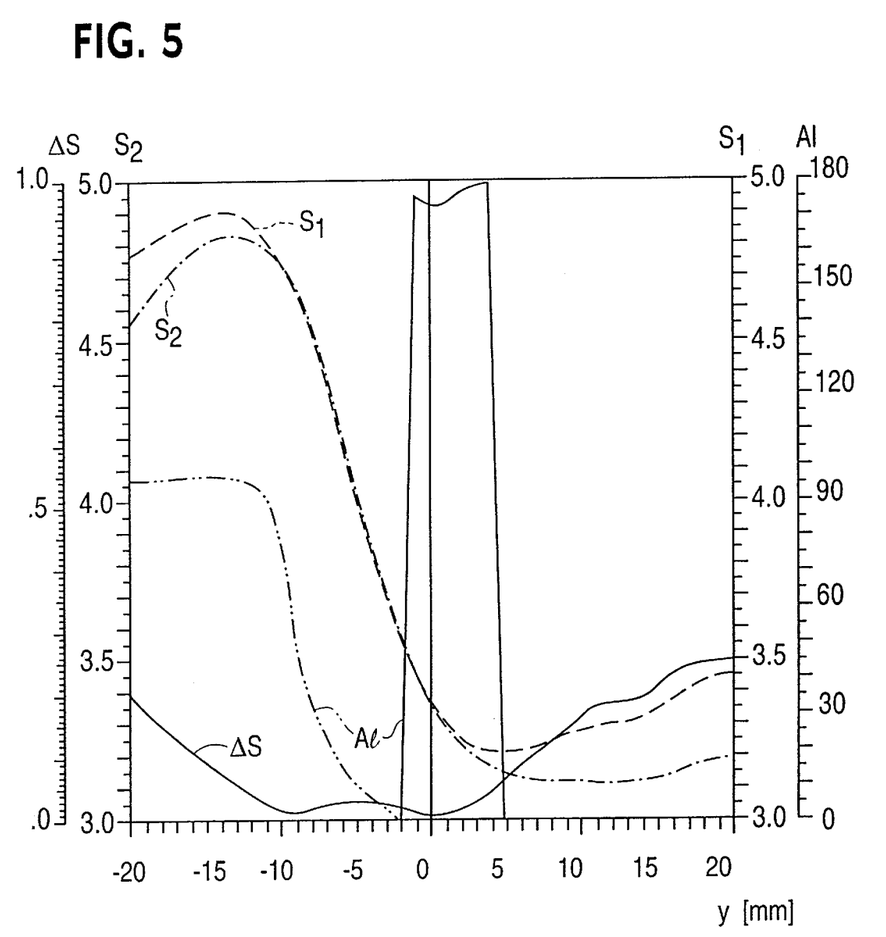

The first embodiment shown in FIGS. 1a to 1e has a surface power BK in the lower region of the distant vision zone (also referred to as base curve [BK]) of 2.3 dpt, an addition Add, i.e. an increase in surface power to the near vision part, of 1.0 dpt and a refractive index of 1.807. The depicted ophthalmic lens, as all the following embodiments, is a "right" ophthalmic lens: the projection of the nasal sweep of the principal line HL on the x, y plane is shown in FIG. 1e.

The representations in FIGS. 1a to 1e describe, due to the specification of the gradient dz/dx of the intersections of the progressive surface and planes having y=const. (hereinafter referred to as horizontal intersections), a progressive surface completely so that an average person skilled in the art working in the pertinent field is able to calculate on the basis of these representations, by way of illustration, the sagittas of the depicted surface. Thus the present invention can also be performed without further specifications.

FIGS. 1c and 1d show that the value of the surface astigmatism $\Delta S$ has a local maximum value, which lies at about x=−1 mm, for horizontal intersections of the progressive surface at y=−11 mm as well as at y=−14 mm. The local maximum value, as shown in the drawings, is a point where the astigmatism curve $\Delta S$ changes direction to provide a downward concavity which is defined by the formulas $\partial(\Delta S)/\partial x = 0$ and $\partial^2(\Delta S)/\partial x^2 < 0$. Since the principal line HL, as FIG. 1e shows, lies at x=1.5 mm for y=−11 mm and x≈2 mm for y=−14 mm, the distance from the principal line HL is no more than 4 mm.

Furthermore, the surface astigmatism $\Delta S$ has two local minimum values, both of which do not lie on the principal line.

The local minimum value, as shown in the drawings, is a point at which the astigmatism curve $\Delta S$ changes direction in an opposite direction from that of the local maximum value to provide an upward concavity and which is defined by the formulas $\partial(\Delta S)/\partial x = 0$ and $\partial^2(\Delta S)/\partial x^2 > 0$. At y=−11 mm, the distance of the local minimum value is larger at x=−14 mm than the distance of the local maximum value, whereas at y=−14 mm the distance of both minimum values from the principal line is greater than the distance of the local maximum value.

The surface astigmatism ΔS depicted in FIG. 1e shows that the near vision zone is distinctly widened compared to the known ophthalmic lenses. Furthermore, it can be seen that the surface astigmatism in the upper part of the progression zone and in the distant vision part has a minimum value on the principal line.

By way of illustration, FIG. 1b shows that the gradient of the horizontal intersections on the site of the principal line as a function of y is not monotonous.

FIGS. 2 to 5 show representations corresponding to FIG. 1a, namely surface astigmatism $\Delta S = S_1 - S_2$ (in dpt), the greater ($S_1$) and smaller ($S_2$) value of the surface power in both principle sections (in dpt) and the axis direction Al of the surface astigmatism according to TABO (in degrees) along the principal line of ophthalmic lenses with other base curves and/or additions. The respective surface powers and additions are given in the brief description of the individual figures.

These representations permit someone skilled in the art to apply the surface completely disclosed in FIGS. 1a to 1e to other base curves and/or additions.

With regard to details and embodiments of these surfaces, reference is made to FIGS. 2 to 5. These figures show, by way of illustration, that the surface astigmatism in the lower region of the distant vision part increases along the principal line approximately linearly, with the gradient of the function of the surface astigmatism on the principal line being a function of the base curve and of the addition.

In the preceding, the present invention is described using preferred embodiments without the intention of limiting scope or spirit of the overall inventive idea as is yielded by the general description including the claims. A great variety of modifications are, of course, possible within the general inventive idea.

When, by way of illustration, this description refers to at least one region (distant vision zone), whose power is suited for distant vision, this does not necessarily imply that this region is designed for "infinite" vision, it can also be designed for short distance vision, such as by way of illustration optimized for 2 m, as long as these distances are distinctly larger than the distance for which the near vision zone is designed.

Furthermore, the principles disclosed in the preceding for "right" lenses can be transferred without difficulty to the left lenses, that is lenses disposed in front of the left eye.

Furthermore, the individual zones or parts can be disposed in a different manner than described and, by way of illustration, provide the near vision part at the top, as is sometimes done in eyeglasses for pilots.

What is claimed is:

1. A progressive ophthalmic lens comprising:
   at least one distant vision zone, the power of which is suitable for distant viewing;
   at least one near vision zone, the power of which is suitable for near viewing; and
   at least one progression zone, in which the power varies continuously from the power of the distant vision zone to the power of the near vision zone along a principal line, at least one surface of the ophthalmic lens contributing to the power variation;
   wherein a surface astigmatism of the at least one surface of the ophthalmic lens contributing to the power variation along at least one horizontal intersection, represented by an intersection of the ophthalmic lens and a horizontal plane where x is variable and y is constant, has a local maximum value which is defined by the formulas $\partial(\Delta S)/\partial x = 0;$ $\partial^2(\Delta S)/\partial x^2 < 0;$ and which is located at a distance in the x direction of not more than 4 mm from said principal line, and at least one local minimum value which is defined by the formulas $\partial(\Delta S)/\partial x = 0;$ $\partial^2(\Delta S)/\partial x^2 > 0;$ and which does not lie on said principal line and is located at a greater distance from said principal line than the location of said local maximum value.

2. A progressive ophthalmic lens according to claim 1, wherein the surface astigmatism has the local maximum value located at a distance of not more than 2 mm from said principal line.

3. A progressive ophthalmic lens according to claim 1, wherein a local minimum value of the surface astigmatism is provided on both sides of said local maximum value with respect to the at least one horizontal intersection.

4. A progressive ophthalmic lens according to claim 2, or 3, wherein the distant vision zone is disposed in an upper part of the ophthalmic lens and at least one near vision zone is disposed in a lower part of the ophthalmic lens.

5. A progressive ophthalmic lens according to claim 4, wherein said at least one horizontal intersection lies in at least one of a lower part of the progression zone and an upper part of the near vision zone.

6. A progressive ophthalmic lens according to claim 5, wherein all said horizontal intersections lie in the range of y=−11 mm to y=−16 mm.

7. A progressive ophthalmic lens according to claim 5, wherein the surface astigmatism in an upper part of the progression zone and in the distant vision zone has a minimum value on said principal line.

8. A progressive ophthalmic lens according to claim 5, wherein an overall astigmatism on said principal line has a minimum value at least between y=15 mm and y=−20 mm on each horizontal intersection.

9. A progressive ophthalmic lens according to claim 5, wherein the surface astigmatism in a lower region of the distant vision zone increases approximately linearly along said principal line.

10. A progressive ophthalmic lens according to claim 9, wherein a gradient of a function of the surface astigmatism on said principal line is a function of a base curve and an addition.

11. A progressive ophthalmic lens according to claim 1, wherein a gradient of the at least one horizontal intersection on the site of said principal line as a function of y is substantially not monotonous.

12. A progressive ophthalmic lens according to claim 11, wherein the gradient of the at least one horizontal intersection on the site of said principal line as a function of y is substantially not monotonous only below a distant vision reference point.

13. A progressive ophthalmic lens according to claim 1, wherein a surface power along said principal line in the near vision zone is selected in such a manner that the power of said near vision zone is constant at a value of substantially y=−20 mm in a wearing position of a user.

14. A progressive ophthalmic lens according to claim 1, wherein principal directions of curvature of a progressive surface along said principal line in a lower region of the distant vision zone are constant.

15. A progressive ophthalmic lens according to claim 1, wherein essentially only the front surface of the ophthalmic lens contributes to the power variation.

16. A progressive ophthalmic lens according to claim 1, wherein the optical power in the distant vision zone is negative.

17. A progressive ophthalmic lens according to claim 1, wherein a refractive index n of a lens material of the ophthalmic lens is greater than 1.58.

18. A progressive ophthalmic lens according to claim 1, wherein said local maximum value is the only local maximum value and is located at a distance of not more than 4 mm from said principal line.

* * * * *